(12) United States Patent
Yu et al.

(10) Patent No.: US 10,657,356 B2
(45) Date of Patent: *May 19, 2020

(54) ELECTRONIC APPARATUS AND FINGERPRINT MODULE THEREOF

(71) Applicant: GUANGDONG OPPO MOBILE TELECOMMUNICATIONS CORP., LTD., Dongguan, Guangdong (CN)

(72) Inventors: Weibin Yu, Dongguan (CN); Maozhao Huang, Dongguan (CN); Mao Yang, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,029

(22) Filed: Nov. 29, 2018

(65) Prior Publication Data

US 2019/0095685 A1 Mar. 28, 2019

Related U.S. Application Data

(63) Continuation-in-part of application No. PCT/CN2017/088948, filed on Jun. 19, 2017.

(30) Foreign Application Priority Data

Aug. 16, 2016 (CN) .......................... 2016 1 0677965
Aug. 16, 2016 (CN) ..................... 2016 2 0890780 U

(51) Int. Cl.
G06K 9/00 (2006.01)
H04M 1/02 (2006.01)
(Continued)

(52) U.S. Cl.
CPC ........... *G06K 9/00053* (2013.01); *G06F 1/16* (2013.01); *G06K 9/0002* (2013.01); *G06K 9/209* (2013.01); *H04M 1/026* (2013.01)

(58) Field of Classification Search
CPC . G06K 9/00053; G06F 1/1684; G06F 1/1626; H04M 1/026
See application file for complete search history.

(56) References Cited

U.S. PATENT DOCUMENTS

2008/0267462 A1 10/2008 Nelson et al.
2011/0162879 A1 7/2011 Bunyan et al.
(Continued)

FOREIGN PATENT DOCUMENTS

| CN | 101382994 A | 3/2009 |
|---|---|---|
| CN | 105373778 A | 3/2016 |

(Continued)

OTHER PUBLICATIONS

International Search Report in international application No. PCT/CN2017/088948, dated Aug. 24, 2017, and translation provided by WIPO.

(Continued)

*Primary Examiner* — Bobbak Safaipour
(74) *Attorney, Agent, or Firm* — Ladas & Parry, LLP

(57) ABSTRACT

A fingerprint module may include a fingerprint identifying assembly, a decoration component, a circuit board assembly and a conductive component. A front side of the decoration component may define an embedded groove, the fingerprint identifying assembly may be embedded in the embedded groove, an end of the circuit board assembly may extend into the embedded groove and be attached to a rear end surface of the fingerprint identifying assembly, a ground terminal may be disposed on the circuit board assembly, the conductive component may be sandwiched between the end of the (Continued)

circuit board assembly and a bottom wall in the embedded groove of the decoration component to electrically connect the decoration component to the ground terminal through the circuit board assembly.

19 Claims, 3 Drawing Sheets

(51) Int. Cl.
*G06F 1/16* (2006.01)
*G06K 9/20* (2006.01)

(56) References Cited

U.S. PATENT DOCUMENTS

| | | |
|---|---|---|
| 2014/0126127 A1 | 5/2014 | Yeh |
| 2015/0014141 A1 | 1/2015 | Rao et al. |
| 2015/0189204 A1 | 7/2015 | Oganesian et al. |
| 2015/0277503 A1* | 10/2015 | Eremenko ............ G06F 1/1658 361/679.4 |
| 2018/0034948 A1* | 2/2018 | Yu ..................... H04M 1/0283 |
| 2019/0294856 A1* | 9/2019 | Yu ......................... G06F 1/1684 |
| 2019/0294857 A1* | 9/2019 | Yu ..................... G06K 9/00053 |

FOREIGN PATENT DOCUMENTS

| | | |
|---|---|---|
| CN | 105404881 A | 3/2016 |
| CN | 105512652 A | 4/2016 |
| CN | 205318405 U | 6/2016 |
| CN | 205375368 U | 7/2016 |
| CN | 105825165 A | 8/2016 |
| CN | 106203403 A | 12/2016 |
| CN | 106203404 A | 12/2016 |
| CN | 206178866 U | 5/2017 |
| CN | 206178867 U | 5/2017 |
| EP | 3399383 A1 | 11/2018 |

OTHER PUBLICATIONS

Written Opinion of the International Search Authority in international application No. PCT/CN2017/088948 , dated Aug. 24, 2017, and English translation provided by Google Translate.
First Office Action from China patent office in a counterpart Chinese patent Application 201610677965.3, dated Jul. 12, 2017 (7 pages).
European search report, EP17840847, dated May 23, 2019 (8 pages).
International search report,PCT/CN2017/088769, dated Aug. 24, 2017 (10 pages).
First Office Action and search report from China patent office in a counterpart Chinese patent Application 201610678006.3, dated Jul. 3, 2017 (10 pages).
Second Office Action and supplemental search report from China patent office in a counterpart Chinese patent Application 201610678006. 3, dated Jul. 3, 2017 (11 pages).
European search report, EP17840846, dated Jun. 4, 2019 (12 pages).
U.S. Final Office Action and Written Opinion for related U.S. Appl. No. 16/439,589, dated Jan. 21, 2020 (9 pages).

* cited by examiner

ELECTRONIC APPARATUS AND FINGERPRINT MODULE THEREOF

CROSS REFERENCE TO RELATED APPLICATIONS

The present application is a continuation-in-part application of International (PCT) Patent Application No. PCT/CN2017/088948 filed on Jun. 19, 2017, which claims foreign priority of Chinese Patent Application No. 201620890780.6, filed on Aug. 16, 2016, and Chinese Patent Application No. 201610677965.3, filed on Aug. 16, 2016 in the State Intellectual Property Office of China, the entire contents of which are hereby incorporated by reference.

TECHNICAL FIELD

The described embodiments relate to electronic device and in particular to an electronic apparatus and a fingerprint module of the electronic apparatus.

BACKGROUND

In the related art, the decoration ring of the fingerprint module of the electronic apparatus is a metal piece, when human hands touch the decoration ring or the decoration ring is rubbed, static electricity is generated, the static electricity has a bad influence on the fingerprint module.

BRIEF DESCRIPTION OF THE DRAWINGS

In order to illustrate the technical solution in the embodiments of the present disclosure more clearly, the accompanying drawings to be used in the description of the embodiments are briefly described below. It will be apparent that the accompanying drawings in the following description are merely embodiments of the present disclosure, other accompanying drawings may be obtained without creative work for those skilled in the art.

DETAILED DESCRIPTION

Figure 1:
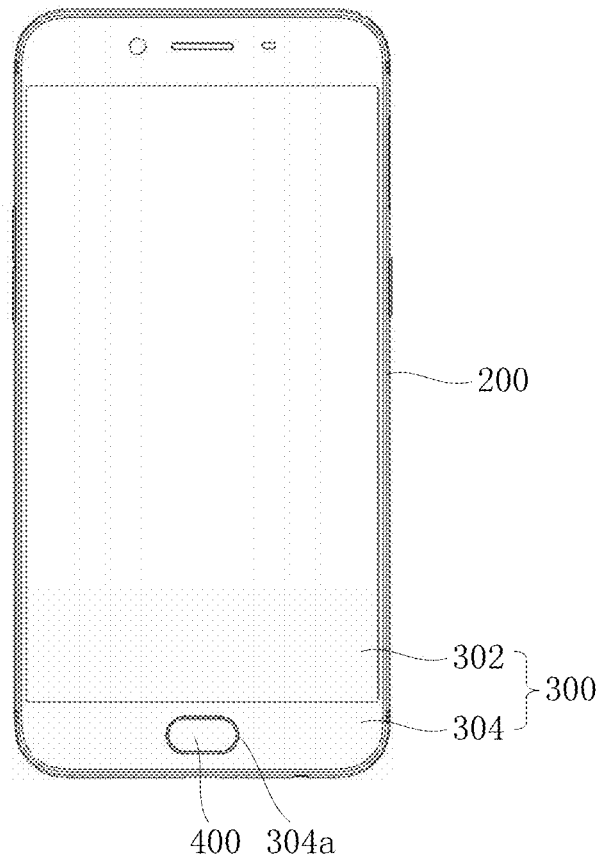
FIG. 1 is a plan view of the electronic apparatus according to an embodiment of the present disclosure.

Embodiments of the present disclosure are described in detail below, examples of which are illustrated in the accompanying drawings. It should be understood that, the embodiments described below are only used for explanation, not for limitation.

In the specification of the present disclosure, it is to be understood that terms such as "thickness", "upper", "lower", "front", "rear", "left", "right", "vertical", "horizontal", "top", "bottom", "inner", "outer" and "circumference" refer to the orientations and locational relations illustrated in the drawings, and for describing the present disclosure and for describing in a simple manner, and which are not intended to indicate or imply that the device or the elements are disposed to locate at the specific directions or are structured and performed in the specific directions, which could not to be understood as limiting the present disclosure.

In addition, terms such as "first" and "second" are used herein for purposes of description and are not intended to indicate or imply relative importance or significance or to imply the number of indicated technical features. Thus, the feature defined with "first" and "second" may include one or more of such a feature. In the description of the present disclosure, "a plurality of" means two or more than two, unless specified otherwise.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the following, an electronic apparatus 100 provided in embodiments of the present disclosure will be described with reference to drawings.

Please referring to FIG. 1, the electronic apparatus 100 may include mobile phone, laptop and tablet computers, etc. It should be understood that "electronic apparatus" in this disclosure can include, but is not limited to, a device that is configured to receive/transmit communication signals via a wireless connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. Examples of the electronic apparatus 100 include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

The electronic apparatus 100 may include a shell assembly 200, a display assembly 300 connected to the shell assembly 200, and a fingerprint module 400 embedded in the display assembly 300.

The shell assembly 200 may define a receiving room (no shown) to received the display assembly 300 and the fingerprint module 400 therein. The display assembly 300 and the fingerprint module 400 may be assembled as a whole to be embedded in the receiving room. In addition, a chamber (not shown) may be defined in the shell assembly 200, to receive some other components such as a battery, a main circuit plate, a camera assembly etc. It should be noted that, in some embodiments, the shell assembly 200 may be made in one piece. While in other embodiments, the shell assembly 200 can also be integrated with different sections. Furthermore, various holes may be defined in the shell assembly 200 such as a key hole, an earphone hole, a USB connection hole, a sound hole, a camera mounting hole, a microphone and the like, in order to make the electronic apparatus 100 be connected with other components. In some embodiments, the shell assembly 200 may be made of metal patterns, such as a logo, may be provided on the outside surface of the shell assembly, which can improve identification and appearance of the electronic apparatus. In some embodiments, an antenna slot (not shown) may be defined in the electronic apparatus 100, and it may be communicated with an antenna component inside the shell assembly.

The display assembly 300 may include a display area 302 and a non-display area 304. The display area 302 may be configured to display input information from a user, and output information of the electronic apparatus 100, or various items of the electronic apparatus 100 for facilitating the user to read related information. The non-display area 304 may define a containing slot 304a for containing the fingerprint module 400.

Figure 2:
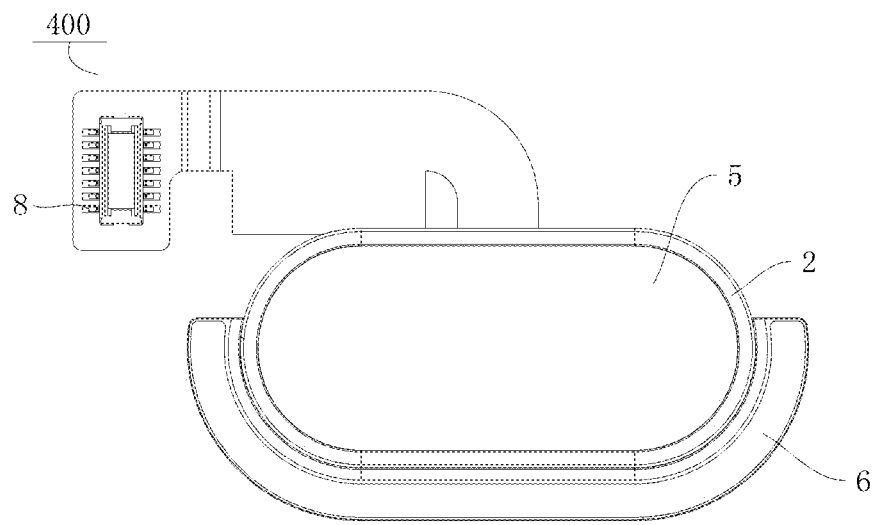
FIG. 2 is a plan view of the fingerprint module according to an embodiment of the present disclosure.
Figure 3:
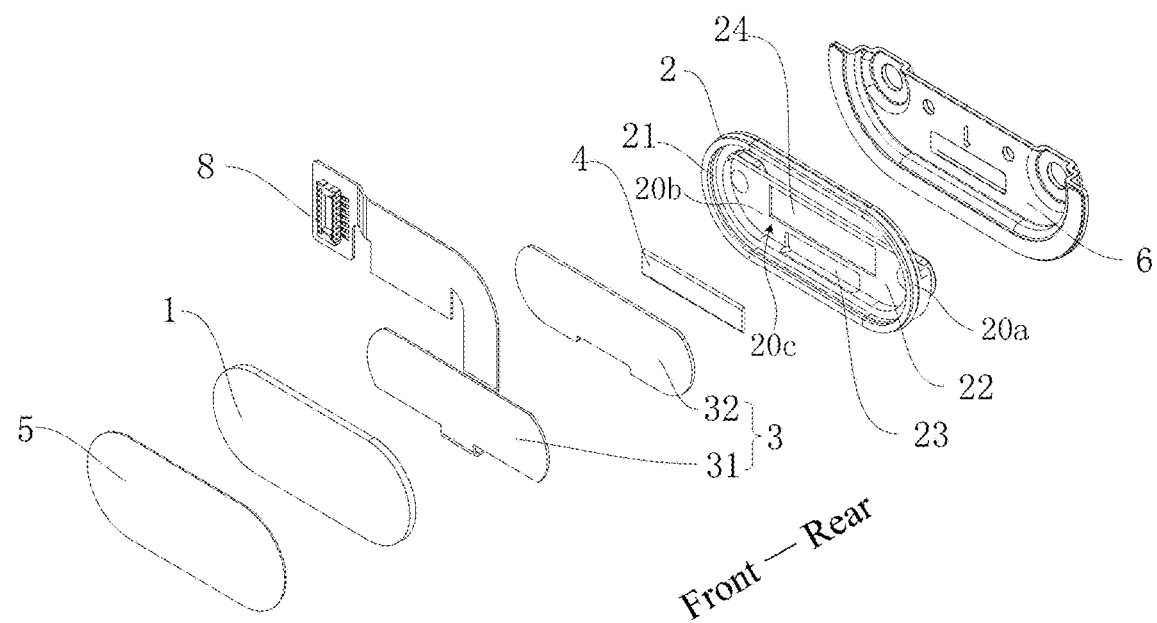
FIG. 3 is an exploded schematic view of the fingerprint module according to an embodiment of the present disclosure.

Referring to the FIG. 2 and FIG. 3, in some embodiments, the fingerprint module 400 may include a fingerprint identifying assembly 7, an encapsulation layer 1, a decoration component 2 and a circuit board assembly 3.

Figure 4:
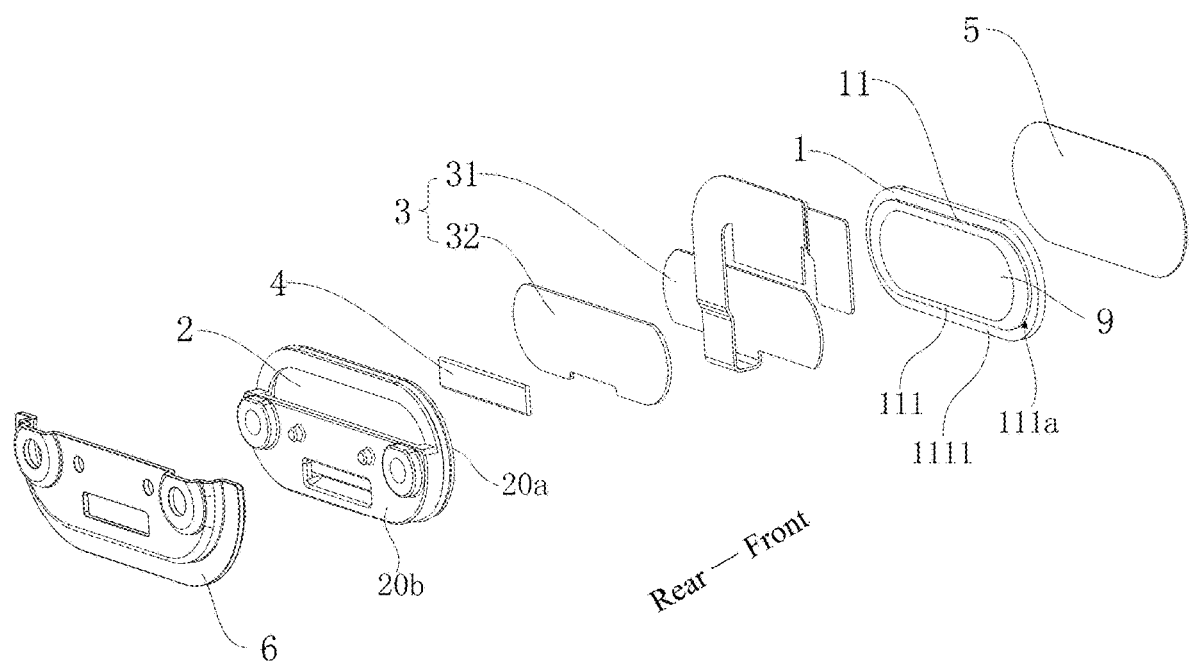
FIG. 4 is another exploded schematic view of the fingerprint module according to the embodiment of the present disclosure.

Referring to FIG. 4, the encapsulation layer 1 may include an end surface 111. An edge region of the end surface 111 may be recessed to form a first step portion 111a.

Figure 5:
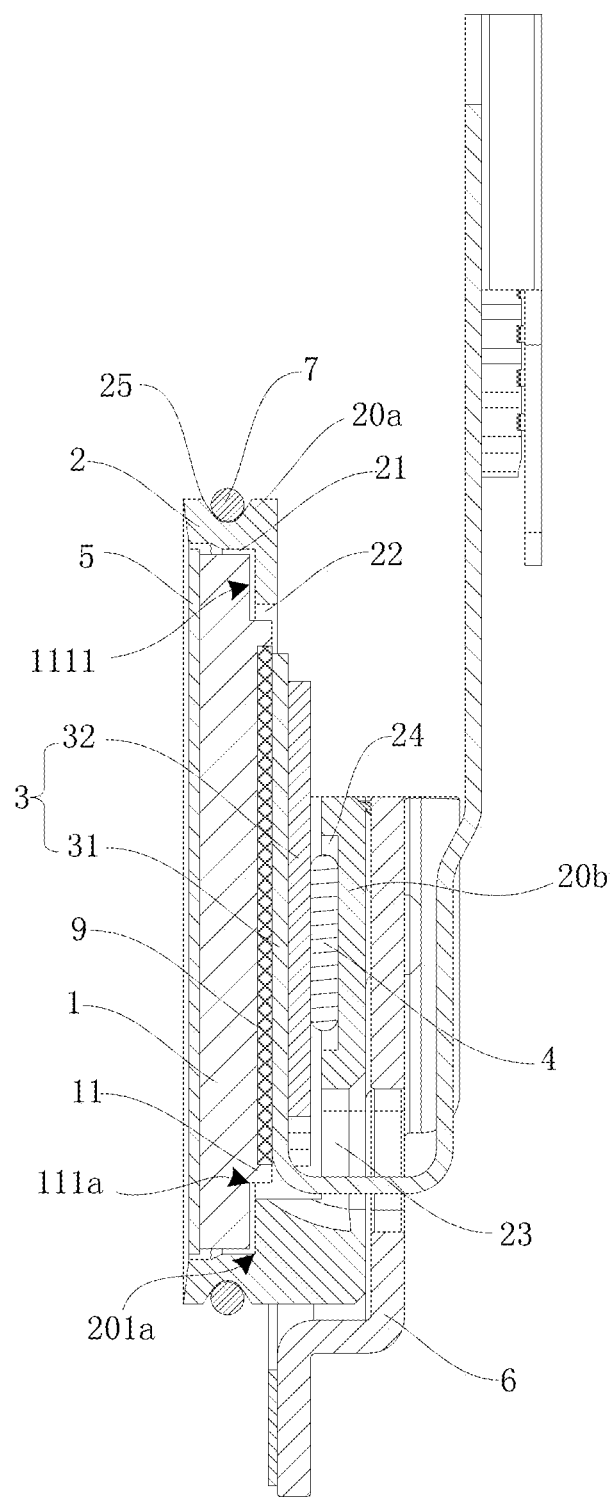
FIG. 5 is a cross-sectional view of the fingerprint module according to an embodiment of the present disclosure.

Referring to FIGS. 3-5, the decoration component 2 may define an embedded cavity 20c, an inner side-surface in the embedded cavity 20c may form a second step portion 201a.

At least part of the circuit board assembly 3 may be received in the embedded cavity 20c. A ground terminal 8 may be disposed on the circuit board assembly 3.

The encapsulation layer 1 may be received in the embedded cavity 20c and the first step portion 111a may match with the second step portion 201a, one side of the circuit board assembly 3 may be attached to the end surface 111 and electrically connected to the fingerprint identifying assembly 9, and the other side of the circuit board assembly 3 may be electrically connected to a bottom wall 20b in the embedded cavity, so that the decoration component 2 may be electrically connected to the ground terminal 8 through the circuit board assembly 3. Furthermore, the first step portion 111a may be connected to the second step portion 201a by glue.

When the encapsulation layer 1 is embedded in the embedded cavity 20c, the first step portion 111a and the second step portion 201a may match with each other, for example, the first step portion 111a may be embedded in the second step portion 201a. The thickness of the encapsulation layer 1 and the decoration component 2 in the front-rear direction can be reduced, so that the thickness of the fingerprint module 400 can be reduced. At the same time, the purpose of grounding the decoration component 2 may be achieved by connecting the decoration component 2 to the ground terminal 8, and the static electricity of the decoration component 2 may be prevented from adversely affecting the fingerprint module 400.

In some embodiments, referring to FIG. 5, a bottom wall 20b of second step portion 201a may connect to at least part of a sidewall 20a in the embedded cavity 20c, that is an area of the bottom wall 20b may be smaller than an area surrounded by the sidewall 20a. A space between the bottom wall 20b and the end surface 111 may be configured to receive the at least part of the circuit board assembly 3.

In some embodiments, the first step portion 111a may include a first sub-step face 1111 facing the embedded cavity 20c. A distance between the end surface 111 and the first sub-step face 1111 may be 0.2 mm.

Referring to FIGS. 2-5, in some embodiments, the fingerprint module 400 may include: a fingerprint identifying assembly 9, a decoration component 2, a circuit board assembly 3 and a conductive component 4.

Specifically, a front side of the decoration component 2 may define an embedded groove 21, the fingerprint identifying assembly 9 may be embedded in the embedded groove 21, which makes the appearance of the fingerprint module more artistic. An end of the circuit board assembly 3 may extend into the embedded groove 21, and the end of the circuit board assembly 3 may be attached to a rear end surface of the fingerprint identifying assembly 9 to ensure a tight connection between the fingerprint identifying assembly 9 and the circuit board assembly 3. A ground terminal 8 may be disposed on the circuit board assembly 3, and the conductive component 4 may be sandwiched between the end of the circuit board assembly 3 and a bottom wall in the embedded groove 21 to electrically connect the decoration component 2 to the ground terminal 8 through the circuit board assembly 3. The purpose of grounding the decoration component 2 could be achieved when the decoration component 2 is electrically connected to the ground terminal 8 through the circuit board assembly 3. Therefore, the static electricity could be avoided to cause the bad influence on the fingerprint module 400, the reliability of the operation of the fingerprint module 400 could be ensured.

In the fingerprint module 400 according to the embodiment of the present disclosure, the purpose of grounding the decoration component 2 could be achieved by extending the end of the circuit board assembly 3 into the embedded groove 21, disposing the ground terminal 8 on the circuit board assembly 3, and disposing the conductive component 4 between the end of the circuit board assembly 3 and the bottom wall in the embedded groove 21 to electrically connect the decoration component 2 to the ground terminal 8 through the circuit board assembly 3. Therefore, the static electricity could be avoided to cause the bad influence on the fingerprint module 400, the reliability of the operation of the fingerprint module 400 could be ensured.

In some embodiments, as shown in FIGS. 3 and 5, the bottom wall in the embedded groove 21 may defines a mounting slot 24, and the conductive component 4 may be embedded in the mounting slot 24. The mounting slot 24 could limit the conductive component 4 to prevent the conductive component 4 from moving away from the bottom wall 20b in the mounting slot 24 of the decoration component 2, thereby ensuring the reliability of connection between the bottom wall 20b in the mounting slot 24 and the circuit board assembly 3 through the conductive component 4.

Specifically, the conductive component 4 may be made of conductive foam. The conductive foam is a conductive cloth wrapped on a flame-retardant sponge. After a series of processes, the conductive foam may have good surface conductivity and can be easily fixed on a device that may require shielding with an adhesive tape. The conductive foam is low in cost, simple in processing, and can ensure the reliability of grounding. When the circuit board assembly 3 is assembled with the decoration component 2, the conductive foam between the circuit board assembly 3 and the decoration component 2 may be compressed to ensure the reliability of connection between the conductive foam and the decoration component 2, thereby ensuring good grounding of the decoration component 2 and preventing the static electricity of the decoration component 2 from adversely affecting the fingerprint module 400.

In some embodiments of the present disclosure, as shown in FIGS. 3 to 5, the circuit board assembly 3 may include: a flexible circuit board 31 and a reinforcing plate 32. An end of the flexible circuit board 31 may extend into the embedded groove 21, and be attached to the rear end surface of the fingerprint identifying assembly 9 facing to the bottom wall 20b (As the rear end shown in FIG. 4). Therefore, the tight connection between the fingerprint identifying assembly 9 and the flexible circuit board 31 can be ensured, and the reliability of the operation of the fingerprint module 400 can be ensured. The ground terminal 8 may be disposed on the flexible circuit board 31, the reinforcing plate 32 may be attached to the flexible circuit board 31 and electrically connected to the flexible circuit board 31. The reinforcing plate 32 may be located at a side of the flexible circuit board 31 away from the fingerprint identifying assembly 9, and the conductive component 4 may be electrically connected to the reinforcing plate 32 (i.e., the reinforcing plate 32 may be a conductive member). The reinforcing plate 32 can enhance the structural strength of the flexible circuit board 31 and prevent the flexible circuit board 31 from being bent, and the like, thereby ensuring the reliability of the flexible circuit board 31. At the same time, the decoration component 2 may be connected to the flexible circuit board 31 through the reinforcing plate 32 and conductive component 4. Therefore, the electrical connection between the decoration component 2 and the ground terminal may be realized through the flexible circuit board 31. As a result, the effect of grounding the decoration component 2 could be achieved to avoid the adverse effect of the static electricity of the decoration component 2 on the fingerprint module 400.

In some embodiments, as shown in FIG. 5, a circumference of the side wall 20a of the decoration component 2 may be covered with a sealing member 7. When the fingerprint module 400 is mounted on an electronic apparatus 100 such as a mobile phone, it could prevent the sweat or other liquid on the hand from intruding into the interior of the electronic apparatus 100 and damaging the components inside the electronic apparatus 100, thereby ensuring the reliability of the operation of the electronic apparatus 100.

Furthermore, as shown in FIG. 5, the circumference of the side wall of the decoration component 2 may include a sealing groove 25, and the sealing member 7 may be embedded in the sealing groove 25. Therefore, the sealing member 7 can be prevented from being tilted in the axial direction of the decoration component 2 (front-rear direction as shown in FIG. 4) to ensure the reliability of the sealing.

In some embodiments of the present disclosure, as shown in FIGS. 3 and 5, the fingerprint module 400 may further include a cover plate 5, the cover plate 5 may be embedded in the embedded groove and located at a front side of the fingerprint identifying assembly 9 (the front side as shown in FIG. 5). On one hand, the cover plate 5 can further protect the fingerprint identifying assembly 9 and the circuit board assembly 3, and on the other hand, the cover plate 5 can also increase the aesthetics of the fingerprint module 400.

The cover plate 5 may be a glass cover plate or a ceramic cover plate, the glass cover plate or the ceramic cover plate has high gloss, which could improve the aesthetics of the fingerprint module 400.

In some embodiments, the fingerprint identifying assembly 9 may be encapsulated by an encapsulation layer 1, a rear wall of the encapsulation layer 1 (the rear side as shown in FIG. 5) may have a first mating portion, the decoration component 2 may define the embedded groove 21, the encapsulation layer 1 may be embedded in the embedded groove 21, and the embedded groove 21 may be provided with a second a mating portion, the first mating portion may be embedded in the second mating portion. Therefore, when the encapsulation layer 1 is embedded in the embedded groove 21, and the first mating portion may be embedded in the second mating portion, the thickness along the front-rear direction of the encapsulation layer 1 and the decoration component 2 can be reduced (the front-rear direction as shown in FIG. 5), so that the thickness of the fingerprint module 400 can be reduced, and the ultra-thin design of the electronic apparatus 100 can be adapted to meet the user's use requirements.

As shown in FIGS. 3-5, the first mating portion may be a protruding portion 11 formed on the rear wall of the encapsulation layer 1 (the rear side as shown in FIG. 5), and the second mating portion may be a recess portion 22 formed in the embedded groove 21, at least a portion of the protruding portion 11 may be located in the recess portion 22. Therefore, when the encapsulation layer 1 and the decoration component 2 are assembled, at least a portion of the protruding portion 11 is embedded in the recess portion 22, and the thickness of the decoration component 2 and the encapsulation layer 1 in the front-rear direction can be reduced, thereby reducing the thickness of the fingerprint module 400.

For example, as the embodiment shown in FIGS. 4 and 5, the rear wall of the encapsulation layer 1 may have a first mating portion, the first mating portion is formed as a protruding portion 11, the decoration component 2 may have an embedded groove 21, the encapsulation layer 1 may be disposed in the embedded groove 21, and the bottom wall in the embedded groove 21 may be provided with the second mating portion formed as a recess portion 22, and the protruding portion 11 may be located in the recess portion 22. The side wall surface of the protruding portion 11 and the rear wall of the encapsulation layer 1 may form a first stepped surface, and the bottom wall in the embedded groove 21 and the side wall of the recess portion 22 may form a second stepped surface, and the first step surface and the second step surface are engaged with each other. Therefore, the displacement of the encapsulation layer 1 relative to the decoration component 2 in the rear direction could be limited, thereby ensuring the reliability of the operation of the fingerprint module 400. And when the thickness of the protruding portion 11 in the front-rear direction is a, the overall thickness of the fingerprint module 400 can be reduced by a.

Specifically, as shown in FIG. 4, the number of the protruding portion 11 may be one. Therefore, the structure and processing technology of the encapsulation layer 1 can be simplified, the production cycle may be saved, and the production cost is reduced. For example, in the embodiment shown in FIG. 4, the rear wall of the encapsulation layer 1 may be provided with a protruding portion 11, the number of the protruding portion 11 is one and located at the center of the encapsulation layer 1. When the encapsulation layer 1 is processed, the encapsulation layer 1 having the same thickness can be processed first, and then a step may be processed in the circumferential direction of the rear wall of the encapsulation layer 1.

The fingerprint module 400 in accordance with one embodiment of the present disclosure is described below with reference to FIGS. 1-5. The following description is merely illustrative and is not intended to limit the invention.

As shown in FIGS. 1-5, a fingerprint module 400 according to an embodiment of the present disclosure may include a fingerprint identifying assembly 9, a decoration component 2, a circuit board assembly 3, a conductive component 4, and a cover plate 5.

Specifically, as shown in FIGS. 4 and 5, the fingerprint module 100 may include an encapsulation layer 1 configured to encapsulate the fingerprint identifying assembly 9, and a first mating portion is disposed on a rear wall of the encapsulation layer 1, and the first mating portion is a protruding portion 11 formed on the rear wall of the encapsulation layer 1, and the number of the protruding portion 11 may be one and located in the middle part of encapsulation layer 1. When the protruding portion 11 is processed, a step can be processed in the circumferential direction of the encapsulating layer 1, and the rear wall of the encapsulating layer 1 and the side wall surface of the protruding portion 11 may form a first stepped surface. As shown in FIGS. 3 and 5, the decoration component 2 may define an embedded groove 21, and the encapsulation layer 1 may be disposed in the embedded groove 21. A second mating portion is formed in the embedded groove 21. The second mating portion may be a recess portion 22 formed in the embedded groove 21. The protruding portion 11 may be located in the recess portion 22. The bottom wall in the embedded groove 21 and the side wall of the recess portion 22 may form a second step surface, and the first step surface may be engaged with the second step surface. When the decoration component 2 and the encapsulation layer 1 are assembled, the thickness of the decoration component 2 and the encapsulation layer 1 in the front-rear direction can be reduced, thereby reducing the thickness of the fingerprint module 400.

It should be noted that when the thickness of the protruding portion 11 in the front-rear direction is a, the overall thickness of the fingerprint module 400 can be reduced by a. For example, when the thickness of the protruding portion 11 in the front-rear direction is 0.2 mm, the thickness of the decoration component 2 after being assembled with the encapsulating layer 1 can be reduced by 0.2 mm in the front-rear direction.

As shown in FIGS. 3-5, the circuit board assembly 3 may include a flexible circuit board 31 and a reinforcing plate 32. The bottom wall 20b of the recess portion 22 of the decoration component 2 may be provided with a through hole 23. An end of the flexible circuit board 31 may extend through the through hole 23 into the recess portion 22 and be attached to the free end surface of the protruding portion 11 facing the bottom wall 20b of the recess portion 22 (i.e., the rear wall surface of the protruding portion 11). On one hand, the encapsulation layer 1 can protect the flexible circuit board 31 and prevent the impurities in the air from corroding the flexible circuit board 31 to cause electrical performance degradation, and on the other hand, the tight connection between the fingerprint identifying assembly 9 in the encapsulation layer 1 and the flexible circuit board 31 can be ensured, and the reliability of the operation of the fingerprint module 400 may be ensured. The reinforcing plate 32 may be a reinforcing steel plate, and the reinforcing plate 32 may be attached to the side of the flexible circuit board 31 away from the encapsulation layer 1 and electrically connected to the flexible circuit board 31, that is, the reinforcing plate 32 may be attached to the rear side wall of the flexible circuit board 31. The reinforcing plate 32 can strengthen the structural strength of the flexible circuit board 31 and prevent the flexible circuit board 31 from being bent and damaged.

In addition, as shown in FIGS. 3-5, the decoration component 2 may be a conductive metal piece, and a ground terminal 8 may be disposed on the other end of the flexible circuit board 31 (the end that does not extend into the recess portion 22). The conductive component 4 may be disposed between the reinforcing plate 32 and the bottom wall 20b of the recess portion 22. The decoration component 2 may be electrically connected to the grounding terminal 8 through the conductive component 4, the reinforcing plate 32 and the flexible circuit board 31. Therefore, the purpose of grounding the decoration component 2 can be achieved, and the static electricity of the decoration component 2 can be prevented from adversely affecting the fingerprint module 400. The conductive component 4 may be made of conductive foam, and the cross section of the conductive foam is rectangular. The bottom wall 20b of the recess portion 22 may be provided with a mounting slot 24 having a rectangular cross section, and the conductive foam may be embedded in the mounting slot 24. Therefore, the conductive foam can be prevented from moving, thereby ensuring the reliability of the electrical connection between the decoration component 2 and the flexible circuit board 31.

As shown in FIG. 5, the cover plate 5 may be a glass cover plate which can be disposed in the embedded groove 21 and located on the front side of the encapsulation layer 1, and the cover plate 5 can block the front side opening of the embedded groove 21. The cover plate 5 may not only further protect the circuit board assembly 3, but also increase the aesthetics of the fingerprint module 400.

As shown in FIG. 5, the circumference of the decoration component 2 is sleeved with the sealing member 7. The sealing member 7 may be embedded in the sealing groove 25 defined by the circumference of the decoration component 2. When the fingerprint module 400 is mounted on an electronic apparatus 100 such as a mobile phone, it could prevent the sweat or other liquid on the hand from intruding into the interior of the electronic apparatus 100 and damaging the components inside the electronic apparatus 100, thereby ensuring the reliability of the operation of the electronic apparatus 100.

As shown in FIGS. 3-5, the fingerprint module 400 may further include a fingerprint pressing plate 6, and the fingerprint pressing plate 6 may be disposed on the rear side of the decoration component 2.

In the process of manufacturing the fingerprint module 400, the cover plate 5, the encapsulation layer 1, the flexible circuit board 31 and the reinforcing plate 32 may be processed together, and then the conductive foam may be pasted into the mounting slot 24 of the decoration component 2. The assembled cover plate 5, the encapsulation layer 1, the flexible circuit board 31 and the reinforcing plate 32 are assembled with the decoration component 2 by dispensing glue and then being held in a pressure. After the glue is pressed for a certain period of time, the glue may be solidified to ensure good grounding between the reinforcing plate 32 and the decoration component 2 through the certain amount of compression of the conductive foam between the reinforcing plate 32 and the decoration component 2.

In the description of the present disclosure, "one embodiment", "partial embodiment", "conceptual embodiment", "illustration", "specific illustration" or "partial illustration" and the like as referential expressions represent specific features, structures, materials or characteristics described in the embodiment or the illustration, meaning that they are at least included in one embodiment or illustration of the present invention. In the present specification, these expressions do not always represent the same embodiment or illustration. The specific features, structures, materials or characteristics described may be combined in an appropriate form in any one or a plurality of embodiments or illustrations.

That is the description of the present invention, and those skilled in the art may change, alter, replace and modify the above-stated embodiments variously in the range without departing from the principle and the technical idea of the present invention. The scope of the present invention is defined by the appended claims and any and all equivalents thereof.

What is claimed is:

1. A fingerprint module, comprising:
   a fingerprint identifying assembly;
   a decoration component, a front side of the decoration component defining an embedded groove, wherein the fingerprint identifying assembly is embedded in the embedded groove;
   a circuit board assembly, an end of the circuit board assembly extending into the embedded groove and being attached to a rear end surface of the fingerprint identifying assembly, wherein a ground terminal is disposed on the circuit board assembly; and
   a conductive component, sandwiched between the end of the circuit board assembly and a bottom wall in the embedded groove of the decoration component to electrically connect the decoration component to the ground terminal through the circuit board assembly;
   wherein the bottom wall defines a through hole, and the circuit board assembly comprises:
      a flexible circuit board, an end of the flexible circuit board extends into the embedded groove through the through hole, and is attached to the rear end surface of the fingerprint identifying assembly, and the other end of the flexible circuit is outside the decoration component, the ground terminal is disposed on the other end of the flexible circuit board.

2. The fingerprint module of claim 1, wherein the bottom wall in the embedded groove defines a mounting slot, and the conductive component is embedded in the mounting slot.

3. The fingerprint module of claim 1, wherein the conductive component is made of conductive foam.

4. The fingerprint module of claim 1, wherein the circuit board assembly comprises:
   a reinforcing plate, attached to the flexible circuit board and electrically connected to the flexible circuit board, the reinforcing plate is located at a side of the flexible circuit board away from the fingerprint identifying assembly, and the conductive component is electrically connected to the reinforcing plate.

5. The fingerprint module of claim 1, wherein the decoration component comprises a side wall, a sealing member is sleeved on an outer peripheral surface of the side wall to seal the fingerprint module in an electronic apparatus.

6. The fingerprint module of claim 5, wherein a sealing groove is defined in the outer peripheral surface of the decoration component, and the sealing member is embedded in the sealing groove.

7. The fingerprint module of claim 1, further comprising a cover plate embedded in embedded groove and located at a front side of the fingerprint identifying assembly to cover the fingerprint identifying assembly.

8. The fingerprint module of claim 7, wherein the cover plate is a glass cover plate or a ceramic cover plate.

9. A fingerprint module, comprising:
   a fingerprint identifying assembly;
   an encapsulation layer, configured to encapsulate the fingerprint identifying assembly, wherein the encapsulation layer comprises a plate-shaped portion having an end surface, and a protruding portion located at the center of the end surface, and an edge region of the end surface is recessed relative to the protruding portion, such that a thickness of the protruding portion is larger than a thickness of the edge region to form a first step portion;
   a decoration component, defining an embedded cavity, an inner side-surface in the embedded cavity forms a second step portion; and
   a circuit board assembly, at least part of the circuit board assembly being received in the embedded cavity, wherein a ground terminal is disposed on the circuit board assembly;
   wherein the fingerprint identifying assembly is embedded in the embedded cavity; the plate-shaped portion covers the embedded cavity, and the protruding portion is received in the embedded cavity attached to one side of the fingerprint identifying assembly; and the first step portion matches with the second step portion, one side of the circuit board assembly is attached to the end surface and electrically connected to the other side of the fingerprint identifying assembly, and the other side of the circuit board assembly is electrically connected to a bottom wall in the embedded cavity, such that the decoration component is electrically connected to the ground terminal through the circuit board assembly.

10. The fingerprint module of claim 9, further comprising a conductive component; wherein a mounting slot is defined in the bottom wall in the embedded cavity, the conductive component is arranged in the mounting slot and contacts with the bottom wall in the embedded cavity and the other side of the circuit board assembly, such that the decoration component is electrically connected to the circuit board assembly.

11. The fingerprint module of claim 10, wherein the circuit board assembly comprises:
   a flexible circuit board, an end of the flexible circuit board extends into the embedded cavity and is attached to the end surface of the encapsulation layer and electrically connected to the fingerprint identifying assembly, the ground terminal is disposed on the flexible circuit board; and
   a reinforcing plate, attached to the flexible circuit board and electrically connected to the flexible circuit board, the reinforcing plate is located at a side of the flexible circuit board away from the end surface of the encapsulation layer, and the conductive component is electrically connected to the reinforcing plate.

12. The fingerprint module of the claim 11, wherein the end of the flexible circuit board is disposed between the conductive component and the end surface, the other end of the flexible circuit board passes through the decoration component and extents out the decoration component, the ground terminal is located on the other end of the flexible circuit board.

13. The fingerprint module of the claim 8, wherein the first step portion is connected to the second step portion by glue.

14. An electronic apparatus, comprising:
   a shell assembly;
   a display assembly, connected to the shell assembly; and
   a fingerprint module embedded in the display assembly and comprising:
      a fingerprint identifying assembly;
      an encapsulation layer, configured to encapsulate the finger print identifying assembly, wherein the encapsulation layer comprises a plate-shaped portion having an end surface, and a protruding portion located at the center of the end surface, and an edge region of the end surface is recessed relative to the protruding portion, such that a thickness of the protruding portion is larger than a thickness of the edge region to form a first step portion;

a decoration component, defining an embedded cavity; and a circuit board assembly, at least part of the circuit board assembly being received in the embedded cavity, wherein a ground terminal is disposed on the circuit board assembly;

wherein the fingerprint identifying assembly is embedded in the embedded cavity; the plate-shaped portion covers the embedded cavity, and the protruding portion is received in the embedded cavity and attached to one side of the fingerprint identifying assembly; one side of the circuit board assembly is attached to the end surface and connected to the other side of the fingerprint identifying assembly, and the other side of the circuit board assembly is electrically connected to a bottom wall in the embedded cavity, such that the decoration component is electrically connected to the circuit board assembly.

15. The electronic apparatus of claim 14, wherein a mounting slot is defined on a side of the bottom wall in the embedded cavity, a conductive component is disposed in the mounting slot and contacts the bottom wall in the embedded cavity and the other side of the circuit board assembly, such that the decoration component is electrically connected to the circuit board assembly.

16. The electronic apparatus of claim 15, wherein an inner surface of a sidewall of the embedded cavity forms a second step portion, the first step portion is embedded in the second step portion.

17. The fingerprint module of claim 16, wherein the circuit board assembly comprises:

a flexible circuit board, an end of the flexible circuit board extends into the embedded cavity and is attached to the end surface of the encapsulation layer and electrically connected to the fingerprint identifying assembly, the ground terminal is disposed on the flexible circuit board; and a reinforcing plate, attached to the flexible circuit board and electrically connected to the flexible circuit board, the reinforcing plate is located at a side of the flexible circuit board away from the end surface of the encapsulation layer, and the conductive component is electrically connected to the reinforcing plate.

18. The electronic apparatus of the claim 17, wherein the end of the flexible circuit board is disposed between the conductive component and the end surface, the other end of the flexible circuit board passes through the decoration component and extents out the decoration component, the ground terminal is located in the other end of the flexible circuit board.

19. The electronic apparatus of claim 16, wherein the first step portion is connected to the second step portion by glue.

* * * * *